United States Patent
Gomez, III

(10) Patent No.: US 8,474,247 B2
(45) Date of Patent: Jul. 2, 2013

(54) PARTICULATE FILTER REGENERATION POST-INJECTION FUEL RATE CONTROL

(75) Inventor: Nicasio Gomez, III, Howell, MI (US)

(73) Assignee: GM Global Technology Operations LLC

( * ) Notice: Subject to any disclaimer, the term of this patent is extended or adjusted under 35 U.S.C. 154(b) by 563 days.

(21) Appl. No.: 12/406,331

(22) Filed: Mar. 18, 2009

(65) Prior Publication Data
US 2010/0236222 A1    Sep. 23, 2010

(51) Int. Cl.
*F01N 3/00* (2006.01)
(52) U.S. Cl.
USPC .............. 60/295; 60/286; 60/299; 60/301
(58) Field of Classification Search
USPC .............. 60/286, 297, 295, 285, 299, 301
See application file for complete search history.

(56) References Cited

U.S. PATENT DOCUMENTS

| | | | |
|---|---|---|---|
| 2002/0194837 A1* | 12/2002 | Fluga et al. | 60/284 |
| 2003/0221423 A1* | 12/2003 | Kosaka et al. | 60/297 |
| 2004/0055280 A1* | 3/2004 | Nishizawa et al. | 60/277 |
| 2008/0314029 A1* | 12/2008 | Okugawa et al. | 60/286 |
| 2009/0235644 A1* | 9/2009 | Wu et al. | 60/285 |
| 2010/0089032 A1* | 4/2010 | Iwashita et al. | 60/274 |

FOREIGN PATENT DOCUMENTS

| | | | |
|---|---|---|---|
| JP | 2006316743 A | * | 11/2006 |
| WO | WO/2007/010701 | * | 1/2007 |
| WO | WO 2008108107 A1 | * | 9/2008 |

OTHER PUBLICATIONS

Machine Translation of JP, 2006-316743A.*
Machine Translation of JP-2006-316743, Machine Translated on Mar. 4, 2013.*

* cited by examiner

*Primary Examiner* — Thomas Denion
*Assistant Examiner* — Patrick Maines

(57) ABSTRACT

A control system for a vehicle includes a mode determination module that selects one of a first post-injection mode and a second post-injection mode based on a regeneration enable signal and a particulate filter temperature signal. An adjustment module selects one of N ramp rate tables based on the selected one of the first post-injection mode and the second post-injection mode. N is an integer greater than 1. The adjustment module generates a post-injected fuel signal based on the selected one of the N ramp rate tables, an ambient temperature signal and the particulate filter temperature signal. The adjustment module outputs the post-injected fuel signal to a fuel injection system.

24 Claims, 3 Drawing Sheets

PARTICULATE FILTER REGENERATION POST-INJECTION FUEL RATE CONTROL

FIELD

The present disclosure relates to engine control systems for internal combustion engines and more particularly to particulate filter regeneration.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A diesel engine produces particulates that are typically filtered from exhaust gas by a diesel particulate filter (DPF). The DPF is disposed in an exhaust system of the diesel engine. Over time, the DPF becomes full and trapped diesel particulates of the DPF must be removed. A regeneration process is performed to remove the particulates. The regeneration process ignites the particulates to initiate an exothermic reaction that propagates along the DPF.

Fuel may be injected into a cylinder of a diesel engine during a combustion cycle and after ignition of a compressed air/fuel mixture. The injected fuel, referred to as post-injected (PI) fuel, may be introduced in ignition and/or exhaust strokes of the combustion cycle. The unburned PI fuel exits the diesel engine with the exhaust gas and may be combusted by an oxidation catalyst disposed in the exhaust system. The heat released by the combustion in the catalyst increases the temperature of the exhaust system, which facilitates the ignition of the DPF particulates. During certain conditions, the regeneration process can cause visible white smoke, which is known as hydrocarbon (HC) break-through.

SUMMARY

In one embodiment, a control system for a vehicle is provided and includes a mode determination module that selects one of a first post-injection mode and a second post-injection mode based on a regeneration enable signal and a particulate filter temperature signal. An adjustment module selects one of N ramp rate tables based on the selected one of the first post-injection mode and the second post-injection mode. N is an integer greater than 1. The adjustment module generates a post-injected fuel signal based on the selected one of the N ramp rate tables, an ambient temperature signal and the particulate filter temperature signal. The adjustment module outputs the post-injected fuel signal to a fuel injection system.

In other features, a post-injection method for an exhaust system of a vehicle is provided and includes selecting one of a first post-injection mode and a second post-injection mode based on a regeneration enable signal and a particulate filter temperature signal. One of N ramp rate tables is selected based on the selected one of the first post-injection mode and the second post-injection mode. N is an integer greater than 1. A post-injected fuel signal is generated based on the selected one of the N ramp rate tables, an ambient temperature signal and the particulate filter temperature signal. The post-injected fuel signal is outputted to a fuel injection system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present disclosure will become more fully understood from the detailed description and the accompanying drawings, wherein.

DETAILED DESCRIPTION

Figure 1:
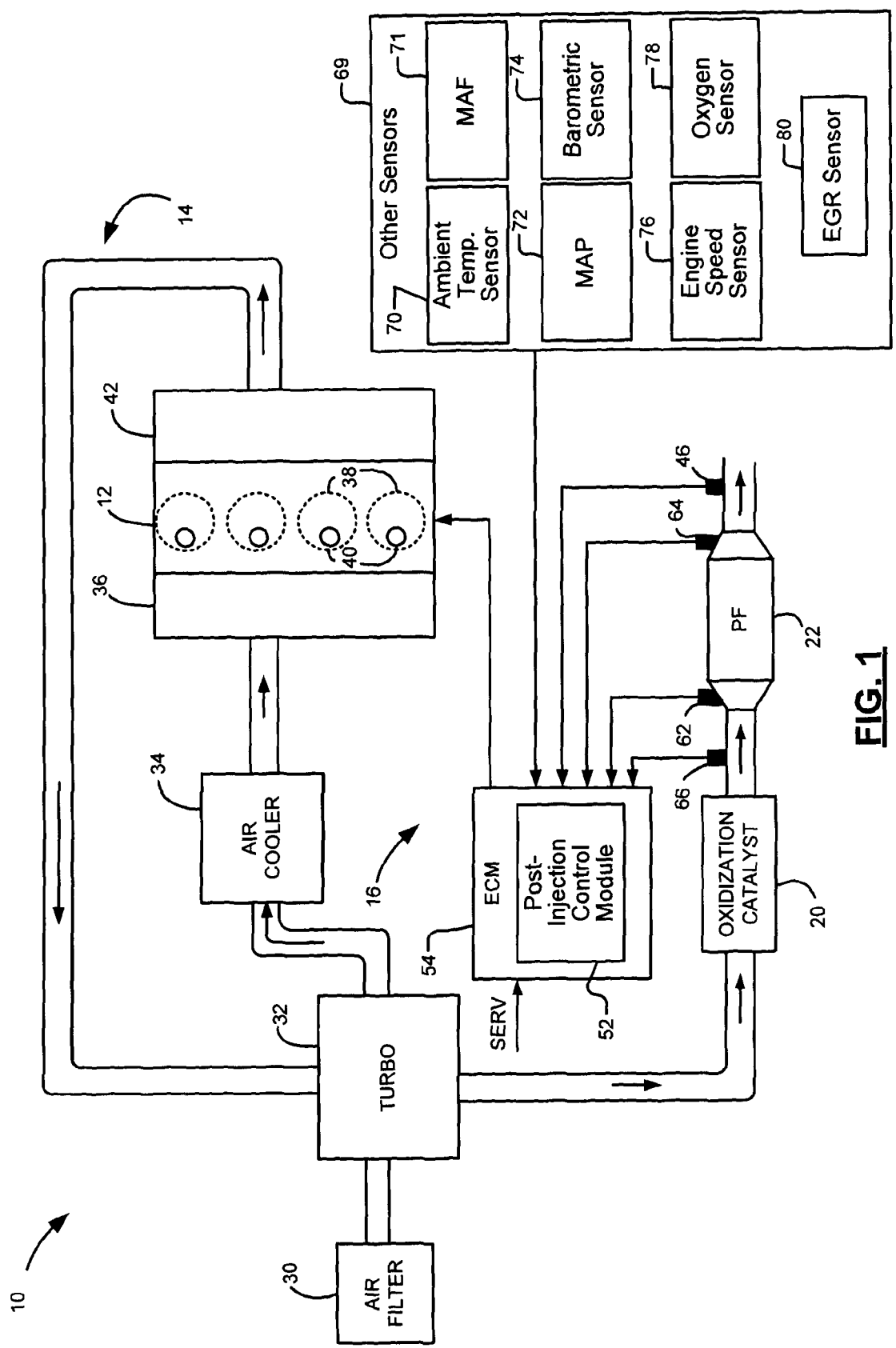
FIG. 1 is a functional block diagram of an engine system incorporating a post-injection system in accordance with an embodiment of the present disclosure.

The following description is merely exemplary in nature and is not intended to limit the present disclosure, application, or uses. As used herein, the term module refers to or includes an Application Specific Integrated Circuit (ASIC), an electronic circuit, a processor (shared, dedicated, or group) and/or memory (shared, dedicated, or group) that execute one or more software or firmware programs, and/or a combinational logic circuit.

Although the following embodiments are described primarily with respect to diesel engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

In the following description various variable labels and values are disclosed. The variable labels and values are provided as examples only. The variable labels are arbitrarily provided and may each be used to refer to different items. For example, the variable label N may be used to refer to a number of ramp rate tables or to a number of sensors.

Furthermore, in the following description terms, such as "first", "second", and "third" may be used. These terms are not specific to any one device, signal, etc. More than one of the terms may be used to refer to the same device, signal, etc. depending upon the context.

During cold ambient conditions, PF regeneration may cause white smoke. The white smoke is caused by excess post-injected (PI) fuel for the PF temperature. The colder a PF the less PI fuel that the PF can support. Hydrocarbons that are not ignited by the PF are released as white smoke.

The amount of PI fuel may be adjusted to prevent HC break-through. As an example, PI fuel release timers may be used to allow the exhaust gas temperature to increase. PI fuel is enabled after a preset period. When the exhaust gas is below a certain temperature HC break-through may occur during post-injection.

The following embodiments provide post-injection techniques that prevent HC break-through and allow for automatic vehicle exhaust system regeneration and service regeneration. An automatic regeneration refers to a regeneration that is performed by a vehicle without external intervention by, for example, a service technician or external vehicle evaluation and/or service system. A service regeneration refers to a regeneration that is initiated manually by a service technician. In certain situations, a particulate filter (PF) may need to be regenerated by a service technician. For example, when PF operating parameters or other vehicle operating parameters exceed preset thresholds, the vehicle regeneration system may prevent automatic regeneration for vehicle system protection and safety reasons. This prevents regeneration until a trained technician or dedicated system evaluates the state of the vehicle prior to performing a regeneration of the PF.

As an example, a line of a turbocharger may inadvertently be removed during vehicle operation. The removal of the line may cause a PF to "clog-up" before a vehicle regeneration system can regenerate the PF. A service regeneration may then be performed to unclog the PF. A service regeneration allows flags, faults, and/or limits to be overridden for performance of a PF regeneration.

Referring now to FIG. 1, an exemplary engine system 10 is shown. The engine system 10 includes an engine 12, an exhaust system 14 and a post-injection fuel control system 16. The exhaust system 14 receives exhaust gas from the engine 12 and includes an oxidation catalyst (OC) 20 and a PF 22. The post-injection system 16 is used to initiate and facilitate regeneration of the PF 22.

The engine system 10 receives air via an air filter 30, a turbocharger 32 and an air cooler 34. In operation, air enters the engine 12 after passing through the air filter 30. Air passes through the air filter 30 and may be drawn into the turbocharger 32. The air is compressed by the turbocharger 32, which may increase the output of the engine 12. The compressed air then passes through the air cooler 34 before entering into an intake manifold 36 of the engine 12. The intake manifold 36 distributes air into cylinders 38 of the engine 12.

The engine 12 further includes fuel injectors 40 and an exhaust manifold 42. Fuel is injected into the cylinders 38 via the fuel injectors 40. The injected fuel mixes with the air to form an air/fuel mixture within the cylinders 38. The air/fuel mixture is compressed by the cylinders 38. The compression generates thermal energy, which ignites the air/fuel mixture. Combustion of the air/fuel mixture creates exhaust gas. The exhaust gas exits the cylinders 38 into the exhaust system 14. Although a particular number of cylinders and fuel injectors are shown, the embodiments disclosed herein apply to engines with any number of cylinders and fuel injectors.

The engine system 10 may include an exhaust gas recirculation (EGR) valve to re-circulate a portion of the exhaust gas back into the intake manifold 36. In operation, the remainder of the exhaust gas from the diesel engine 12 flows from the exhaust manifold 42 into the turbocharger 32 to drive a turbine. The turbine facilitates the compression of the air received from the air filter 30. The exhaust gas flows from the turbocharger 32 through the OC 20. The OC 20 oxidizes oxygen and un-ignited and/or partially ignited hydrocarbons within the exhaust system 14. The oxidation of oxygen and un-ignited and/or partially ignited hydrocarbons by the OC 22 increases the temperature of the exhaust gas. The exhaust gas flows from the OC 22 into the PF 22. The PF 22 filters soot particulates in the exhaust gas.

The engine system 10 also includes an engine control module (ECM) 50 with a post-injection control module 52 and various sensors. The ECM 50 initiates and performs a regeneration based on signals received from the sensors. The post-injection control module 52 controls temperature ramping rates of the PF 22 by controlling PI fuel levels or PI fuel ramp rates during regeneration based on the sensor signals. The PI fuel ramp rates refer to increases and/or decreases in PI fuel over time. The sensors may include a PF inlet temperature sensor 62, a PF outlet temperature sensor 64, a PF inlet pressure sensor 66, and/or a PF outlet pressure sensor 68, and other engine and exhaust system sensors 69. For example, the other engine and exhaust system sensors 69 may include an ambient temperature sensor 70, a mass airflow sensor 71, a manifold absolute pressure sensor 72, a barometric pressure sensor 74, an engine speed sensor 76, an oxygen sensor 78, an EGR sensor 80, etc.

The ECM 50 may initiate PF regeneration when certain conditions are met. For example, the ECM 50 may initiate a regeneration event when load on the PF 22, referred to as a soot load, exceeds a threshold level (e.g. 5 grams/liter of particulate matter). As another example, the ECM 50 may initiate a regeneration event when operation time of the engine 12, the exhaust system 14 and/or the PF 22 since a previous regeneration event exceeds a predetermined period (e.g. 250 minutes). As yet another example, the ECM 50 may initiate regeneration when the associated vehicle of the PF 22 has traveled a predetermined distance since a previous regeneration event (e.g. 250 miles). The above examples conditions may be used alone or in any combination.

The ECM 50 may determine soot loading based on a difference between inlet and outlet pressures of the exhaust gas entering and exiting the PF 22. The pressure of the exhaust gas entering the PF 22 may be sensed via the inlet pressure sensor 66. The pressure of the exhaust gas exiting the PF 22 may be sensed via the outlet pressure sensor 68. The operation time of the engine 12, the exhaust system 14 and/or the PF 22 may be based on respective timers. The travel distance of the vehicle may be determined, for example, via a transmission sensor, a wheel sensor, and/or a global positioning system (GPS).

During a regeneration event, the post-injection control module 52 controls the injection of PI fuel. The post-injection control module 52 may inject PI fuel in the cylinders 38 during ignition and/or exhaust strokes and based on current operating conditions and states of the engine 12 and exhaust system 14. The PI fuel is vaporized during the ignition and/or exhaust strokes and enters the exhaust system 14. The vaporized fuel flows via the exhaust system 14 into the OC 20, which combusts the vaporized fuel, increasing the temperature of the exhaust gas, the OC 20, and the PF 22.

The post-injection control module 52 adjusts the PI fuel levels based on various parameters, such as ambient temperature, inlet and outlet temperatures and pressures of the PF 22, soot loading of the PF 22, engine speed, engine load, etc. The parameters may be determined via the sensors 62-80. PI fuel maximum and minimum limits may be set. This maintains the amount of PI fuel within a predetermined range. The maintenance of the PI fuel within a predetermined PI fuel range aids in maintaining the temperature of the PF 22 within a predetermined operating temperature range and improves efficiency of regeneration.

Limiting the maximum amount of PI fuel that is injected within a period prevents the PF 22 from exceeding an operating temperature that may result in damage to the PF 22. For example, the PF 22 may begin to breakdown at operating temperatures greater than 800° C. Peak operating temperature of the PF 22 may be associated with an average temperature of the PF 22 as a whole or of a portion of the PF 22, such as an inlet and/or outlet of the PF 22. Limiting the minimum amount of PI fuel may maintain the PF above (hotter than) a predetermined temperature, which enables a regeneration exothermic reaction. This prevents HC break-through. The post-injection control module 52 may enable and adjust rates of PI fuel when the temperature of the PF 22 is less than (colder than) a predetermined temperature.

The ECM 50 may prevent regeneration of the PF 22 in certain conditions. To override the ECM 50, the ECM 50 may receive a service regeneration signal SERV to perform a manual regeneration. During the service regeneration, the post-injection control module 52 may determine PI fuel levels and/or a PI fuel rate (service PI rate) and a maximum PI fuel limit (service maximum limit). The service PI rate and the service maximum limit may be based on the ambient temperature, the inlet and outlet temperatures and pressures of the PF, the soot loading of the PF, the engine speed, the engine load, etc.

Figure 2:
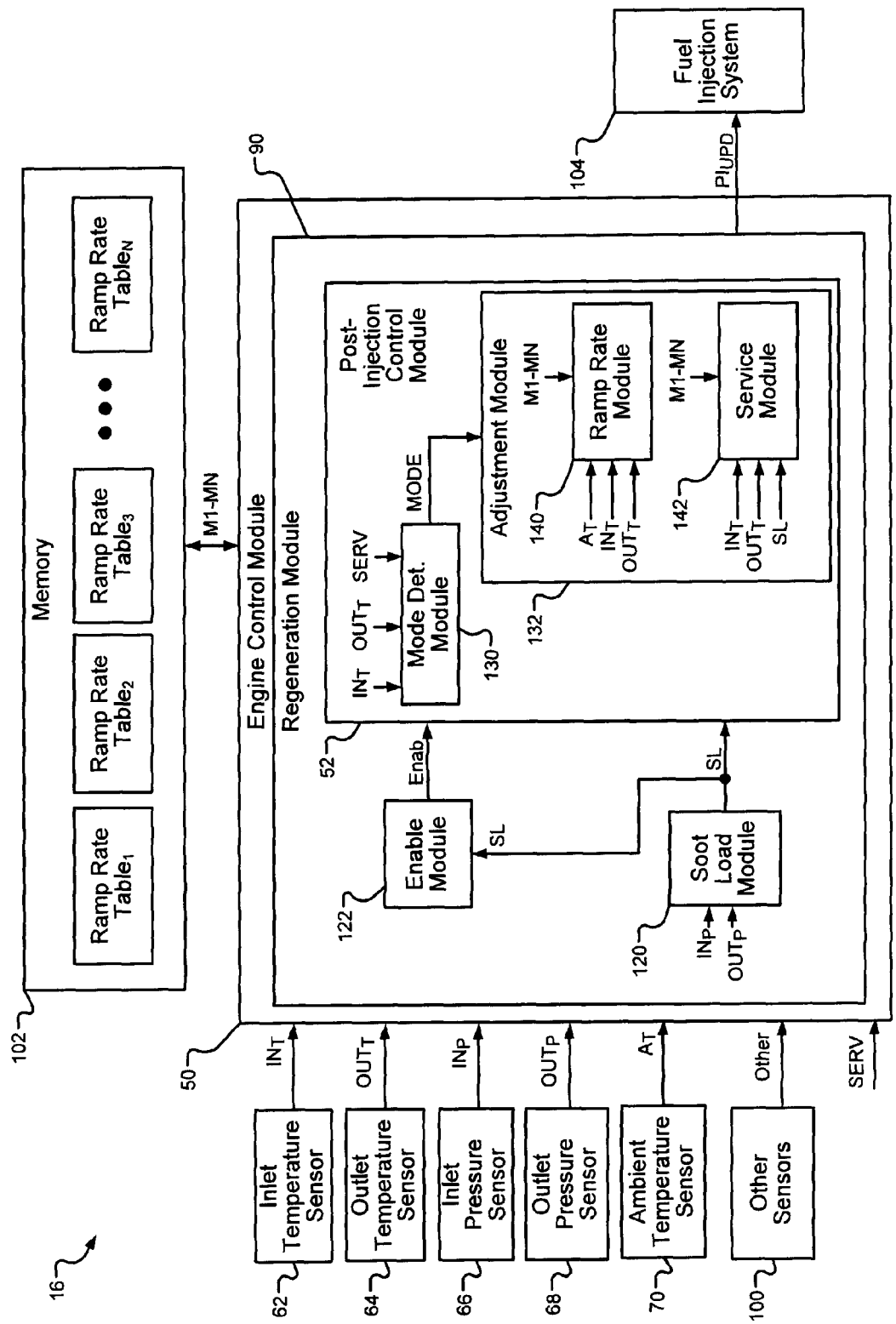
FIG. 2 is a functional block diagram illustrating a post-injection system in accordance with an embodiment of the present disclosure.

Referring now also to FIG. 2, a functional block diagram of the post-injection system 16 is shown. The post-injection system 16 includes the ECM 50 with a regeneration module 90 that includes the post-injection control module 52. The ECM 50 receives respective signals $IN_T$, $OUT_T$, $IN_P$, $OUT_P$ and $A_T$ from the inlet temperature sensor 62, the outlet temperature sensor 64, the inlet pressure sensor 66, the outlet pressure sensor 68 and the ambient temperature sensor 70. The ECM 50 may receive other sensor signals from other sensors 100, such as from the sensors shown in FIG. 1 (designated Other). The ECM 50 accesses regeneration rate tables from memory 102 based on the received sensor signals to generate a PI fuel update signal $PI_{UPD}$ that is provided to a fuel injection system 104.

The memory 102 includes ramp rate tables, N with corresponding ramp rate table signals$_{M1-MN}$. Although shown as tables, the ramp rate tables may include graphs, maps, etc. The ramp rate tables, N provide PI fuel values based on parameters, such as that provided by the sensors 62, 64, 66, 68, 70, and 100. The PI fuel values are provided as ramp rate table signals M1-MN. Each of the ramp rate signals M1-MN may be associated with a respective one of the ramp rate tables$_{1-N}$. The PI fuel values may include injector ON periods, injector opening sizes, fuel pressures, or other values that indicate the amount of PI fuel injected into each cylinder of the engine 12 within a predetermined period. The ramp rate tables$_{1-N}$ are used to ramp up the temperature of the PF 22 and have respective temperature and PI fuel ramp rates.

As an example, the first ramp rate table$_1$ may include a stored relationship between ambient temperature values, PF temperature values, and PI fuel values. The PF temperature values of the first ramp rate table$_1$ may include PF inlet and outlet temperature values. PI fuel values may be looked-up based on a measured ambient temperature and PF inlet temperature. As another example, the second ramp rate table$_2$ may include another stored relationship between ambient temperature values, PF temperature values, and PI fuel values. The PF temperature values of the second ramp rate table$_2$ may include PF inlet and outlet temperature values. The stored relationship in the second ramp rate table$_2$ may provide PI fuel values that may be used to ramp the temperature of the PF 22 over time at a slower rate than the PI values associated with the first ramp rate table$_1$.

The first ramp rate table$_1$ may be used when: the PF 22 is operating at a temperature greater than a first predetermined temperature $T_P$, such as 500° C.; and/or ambient temperature is greater than a second predetermined temperature $T_A$. The second ramp rate table$_2$ may be used when: the PF is operating at temperatures less than or equal to the first predetermined temperature $T_P$; and/or ambient temperature is less than or equal to the second predetermined temperature $T_A$. PI fuel values may be determined independent of the second ramp rate table$_2$ when: the temperature of the PF 22 is greater than the predetermined temperature $T_P$; and/or ambient temperature is greater than a second predetermined temperature $T_A$. The second ramp rate table$_2$ may have maximum values that are less than maximum values of the first ramp rate table$_1$. The use of a reduced rate table when the PF 22 is operating at colder temperatures prevents HC break-through.

The ramp rate tables$_{1-N}$ may include maximum and minimum limits for PI fuel values. This maintains the PF 22 operating within a predetermined temperature range. One or more of the ramp rate tables$_{1-N}$ may be used during a single regeneration event. The same ramp rate table may be used throughout an entire regeneration event or multiple ramp rate tables may be used during a regeneration event. For example, the second ramp rate table$_2$ may be selected and used when: the PF 22 is operating at a temperature that is less than or equal to the first predetermined temperature $T_P$; and/or ambient temperature is less than or equal to the second predetermined temperature $T_A$. The same (second) ramp rate table may be used when: the temperature of the PF 22 exceeds the first predetermined temperature $T_P$; and/or ambient temperature exceeds the second predetermined temperature $T_A$. As an alternative, when the PF 22 exceeds the first predetermined temperature $T_P$ or the ambient temperature exceeds the second predetermined temperature $T_A$, the first ramp rate table$_1$ may be used instead of the second ramp rate table$_2$.

In one embodiment, the first ramp rate table$_1$ does not include a maximum PF fuel limit and is used when: the PF 22 is operating at a temperature greater than the first predetermined temperature $T_P$; and/or ambient temperature is greater than the second predetermined temperature $T_A$. The second ramp rate table$_2$ includes a maximum PF fuel limit and is used when: the PF is operating at temperatures less than or equal to the first predetermined temperature $T_P$; and/or ambient temperature is less than or equal to the second predetermined temperature $T_A$. When the first ramp rate table$_1$ is used, the amount of PF fuel injected may increase according to the corresponding sensor values without limit. When the second ramp rate table$_2$ is used, the amount of PF fuel injected increases according to corresponding sensor values up to the set maximum PF fuel limit. The second ramp rate table$_2$ may as such provide the same maximum PI fuel value for increasingly different inputs, such as increasingly different ambient temperature values and particulate filter temperature values. This allows for a quicker increase in temperature of the PF 22 after: the PF 22 is at a temperature that is greater than the predetermined temperature $T_P$; and/or ambient temperature is greater than the second predetermined temperature $T_A$.

The post-injection control module 52 may prevent use of the second ramp rate table$_2$ (or other ramp rate table) and/or maximum PI fuel limits for a predetermined period. The predetermined period may be calibrated. This allows the PF 22 to ramp up in temperature quickly when initially above the predetermined temperature and/or when other system components are "warmed up". The disabling or nonuse of ramp rate tables and/or maximum PF fuel limits may be based on regeneration time for a current regeneration event or signals from any of the sensors 62-70 and 100.

As yet another example, a first ramp rate map with an x-axis of PF inlet temperature and a y-axis of ambient temperature to control ramp-up rate of post injection quantity is used. A second ramp rate map with the same x-axis and y-axis is used to limit the maximum post injection quantity during an initial start of PF regeneration. When the PF 22 and/or the exhaust system 14 is at a predetermined temperature, the second ramp rate map is disabled or is not used for a predetermined period of time. The predetermined period of time may be calibrated. The second ramp rate map may be disabled for the predetermined period while the inlet of the PF 22 is at a temperature that is less than a predetermined temperature.

This allows for rapid warm up when the OC 20 and other components are at temperatures above a predetermined temperature.

As a further example, the third ramp rate table$_3$ or map may include a stored relationship between soot load values, PF inlet temperature values and PI fuel values. For example, the third map may have a y-axis associated with soot loading and an x-axis associated with PF inlet temperature. PI fuel values may be looked-up based on a measured soot loading and PF inlet temperature. The third ramp rate table$_3$ or map may be used when a service regeneration is performed. The third ramp rate table$_3$ or map may include maximum and minimum PI fuel limits.

The regeneration module 90 may include a soot load module 120, an enable module 122, and the post-injection control module 52. The soot load module 120 may generate a current soot load signal $S_L$ based on the inlet pressure signal $IN_P$ and the outlet pressure signal $OUT_P$. The enable module 122 may generate an enable signal Enab to enable regeneration based on the current soot load signal $S_L$ and/or based on other regeneration initiation conditions stated herein. Additionally, the enable module 122 may generate the enable signal Enab based on the inlet temperature signal $IN_T$ and/or the outlet temperature signal $OUT_T$.

As an example, regeneration may be performed when a current soot load level is within a predetermined range or is greater than or equal to a lower predetermined threshold. The predetermined range may have a soot load upper threshold $S_{UT}$ that may be associated with a maximum soot load value. The predetermined ranged also may have a soot load lower threshold $S_{LT}$, that may be associated with a minimum soot load value.

Soot loading may be estimated based on parameters, such as vehicle mileage and/or vehicle operating time. Mileage provides an estimate vehicle engine operating time and/or an amount of exhaust gas generated. For example, when the vehicle has traveled approximately 300 miles, the regeneration of the PF 22 may be performed. The amount of soot generated by an engine system depends upon vehicle operation over time. At idle speeds, less soot is generated than when operating at travel speeds. The amount of exhaust gas generated is related to the quantity of soot in the PF 22.

The post-injection control module 52 may control the temperature of the PF 22 and/or the temperature of the exhaust gas during regeneration based on a PI rate associated with the PI fuel values from the ramp rate tables$_{1-N}$. The post-injection control module 52 maintains the temperature of the PF 22 within a predetermined temperature range. The post-injection control module 52 may control the temperature of the PF 22 based on feedback from the sensors 62-70 and 100 during regeneration.

The post-injection control module 52 may include a mode determination module 130 and an adjustment module 132. The mode determination module 130 determines an operating mode and generates a mode signal MODE, for example, based on the inlet temperature signal $IN_T$, the outlet temperature signal $OUT_T$, the enable signal Enab, and/or the service signal SERV. The post-injection system 16 may operate in various PI fuel modes including a first ramp rate mode, a second ramp rate mode and a service mode. The modes may be selected by the mode determination module 130. The first ramp rate mode may be associated with operation using the first ramp rate table$_1$, the second ramp rate mode may be associated with operation using the second ramp rate table$_2$, and the service mode may be associated with using the third ramp rate table$_3$.

The adjustment module 132 may adjust the PI fuel during regeneration to adjust an operating temperature $PF_T$ of the PF 22. The adjustment module 132 includes a ramp rate module 140 and a service module 142. The ramp rate module 140 and/or the service module 142 may generate the PI update signal $PI_{UPD}$ based on the operating mode.

The ramp rate module 140 may be used during non-service modes of operation. The ramp rate module 140 operates in multiple modes including the first ramp rate mode and the second ramp rate mode. The ramp rate module 140 may generate the PI update signal $PI_{UPD}$, as shown, based on the ambient temperature signal, the inlet temperature signal and/or the outlet temperature signal.

The service module 142 may be used when operating in a service mode and/or when performing a service regeneration. The service module 142 may generate the PI update signal $PI_{UPD}$, as shown, based the inlet temperature signal, the outlet temperature signal and the soot loading. During a service regeneration, the engine 12 may be operated at a predetermined speed, (e.g. 2500 rotations per minute), which may draw a large quantity of air into the exhaust system 14. The controlled PI fuel injection described herein, for example, using the third ramp rate table$_3$, allows for efficient regeneration to be performed.

Figure 3:
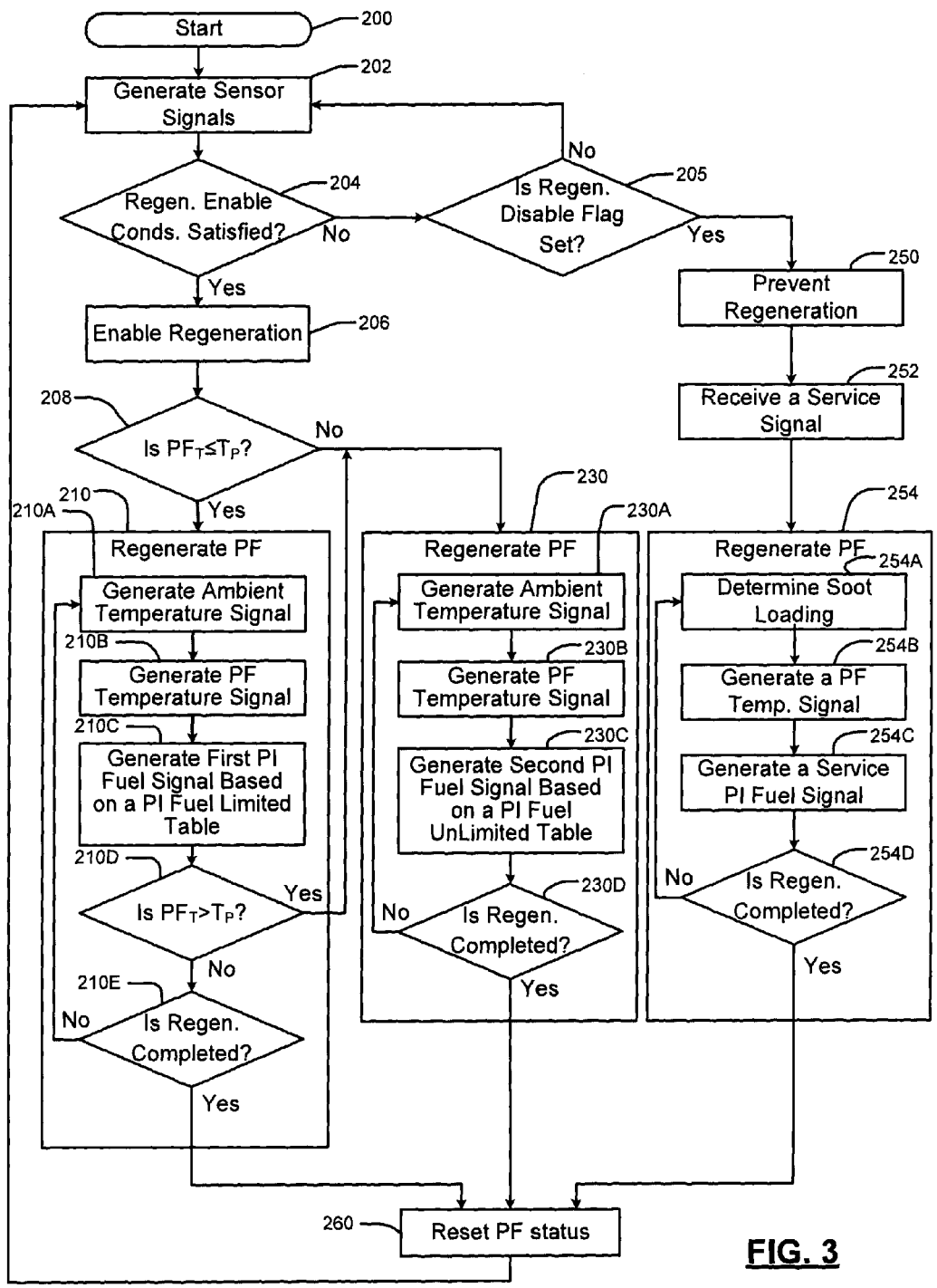
FIG. 3 illustrates an exemplary post-injection method in accordance with an embodiment of the present disclosure.

Referring now also to FIG. 3, a post-injection control method for performance by a post-injection system, such as the post-injection system 16, is shown. Although the following steps are described with respect to the embodiment of FIGS. 1-2, the steps may be modified and/or applied to other embodiments of the present disclosure. The following steps 200-236 may be iteratively performed. The method may begin at step 200.

In step 202, sensor signals are generated. The sensor signals may include the signals generated by the sensors 62-70 and 100 of FIG. 2. In step 204, a soot load module, such as the soot load module 120, determines the soot loading of a PF. When the soot loading has exceeded a predetermined threshold or is within a predetermined range, control may proceed to step 206, otherwise control proceeds to step 205.

The soot load module may estimate a current soot load $S_L$ of the PF. The estimate may, for example, be based on inlet pressure and outlet pressure of the PF, vehicle mileage since last regeneration, and/or vehicle operating time since last regeneration. An enable module, such as the enable module 122, may determine whether the current soot load $S_L$ is greater than a soot load lower threshold $S_{LT}$ and less than a soot load upper threshold $S_{UT}$. When the current soot load $S_L$ is greater than the soot load lower threshold $S_{LT}$ and less than a soot load upper threshold $S_{UT}$, control may proceed to step 206.

In step 205, control determines whether a regeneration disable flag (stored disable value) is set. Control may not perform regeneration when the regeneration disable flag is set. The regeneration disable flag may be set for various reasons. As one example, the regeneration disable flag may be set when the PF 20 is overloaded. For example, when the current soot load $S_L$ is greater than the soot load upper threshold $S_{UT}$, the regeneration disable flag may be set. Control may set the regeneration disable flag for other reasons, such as when an exhaust system fault exists. An exhaust system fault may be indicated by the ECM 50 and may be associated with post-injection devices, light-off devices, etc. When the regeneration disable flag is set, control may proceed to step 250, otherwise control may return to step 202.

In step 206, regeneration may be enabled. In step 208, when a temperature $PF_T$ of the PF is less than or equal to a predetermined temperature $T_P$, control may proceed to step 210, otherwise control may proceed to step 230.

In step 210, the PF is regenerated. Post-injection is enabled and initiated. The post-injection system is operated in, for example, the first post-injection mode. A regeneration timer may be started. The regeneration time may be stored in memory, such as the memory 102. The initiation of post-injection may initiate and facilitate light-off of the PF. The PI fuel is oxidized by an OC to generate heat, which may initiate and/or be used to control the regeneration process. The regeneration process may be initiated and/or facilitated using other techniques, such as using electrically heated elements within the PF to control heating of one or more zones of the PF. The initiation may include heating the PF based on conduction, convection, microwave energy, etc. PF heating techniques other than post-injection control may be disabled once regeneration begins.

In step 210A, before and/or during regeneration an ambient temperature signal may be generated by an ambient temperature sensor. The ambient temperature signal may be generated in step 202 and may be iteratively updated in step 210.

In step 210B, before and/or during regeneration a PF temperature signal, such as the inlet temperature signal and/or the outlet temperature signal, may be generated. The PF temperature signal may be generated in step 202 and may be iteratively updated in step 210.

In step 210C, before and/or during regeneration a first PI fuel signal may be generated by a ramp rate module, such as the ramp rate module 140. The first PI fuel signal may be provided as the PI fuel update signal $PI_{UPD}$ to a fuel injection system. The first PI fuel signal may be generated based on a first ramp rate table, such as one or more of the ramp rate tables of FIG. 2, and based on the determined ambient temperature of step 210A and the PF temperature signal of step 210B. The first PI fuel signal may not be generated based on one or more PI fuel limits, such as a maximum PI fuel limit. This allows for quick heating of the PF. The first PI fuel signal may be iteratively updated during regeneration in step 210.

In step 210D, when the temperature $PF_T$ of the PF is greater than the first predetermined temperature $T_P$, control may proceed to step 230, as shown. A mode determination module, such as the mode determination module 130, may change operating modes based on the temperature signals from steps 210A and 210B. Although shown as proceeding to step 230 when the is greater than the first predetermined temperature $T_P$, control may also or alternatively proceed to step 230 when the ambient temperature is greater than the second predetermined temperature $T_A$. When using a single ramp rate table, control may proceed to step 210E instead of step 230. When the temperature $PF_T$ of the PF is less than or equal to the predetermined temperature $T_P$ and/or when the ambient temperature is less than or equal to the second predetermined temperature $T_A$, control may proceed to step 210E.

In step 210E, when regeneration is completed, control may proceed to step 260, otherwise control may return to step 210A. The regeneration module 90 may determine that regeneration is complete, for example, when a predetermined period has lapsed, when inlet and outlet pressures of the PF are within predetermined completion ranges, etc.

In step 230, the PF is regenerated. Post-injection is enabled and initiated. The post-injection system is operated in a second post-injection mode. A regeneration timer may be started if not previously started in step 210. The regeneration time may be stored in the memory. In step 230A, before and/or during regeneration an ambient temperature signal may be generated. The ambient temperature signal may be generated in step 202 or 210 and may be iteratively updated in step 230.

In step 230B, before and/or during regeneration a PF temperature signal, such as the inlet temperature signal and/or the outlet temperature signal, may be generated. The PF temperature signal may be generated in step 202 or 210 and may be iteratively updated in step 230.

In step 230C, before and/or during regeneration a second PI fuel signal may be generated. The second PI fuel signal may be provided as the PI fuel update signal $PI_{UPD}$ to a fuel injection system. The second PI fuel signal may be generated based on a second ramp rate table, such as one or more of the ramp rate tables of FIG. 2, and based on the determined ambient temperature of step 230A and the PF temperature signal of step 230B. The second PI fuel signal may also be generated based on one or more PI fuel limits, such as a maximum PI fuel limit. The second PI fuel signal may be iteratively updated during regeneration in step 230.

In step 230D, when regeneration is completed, control may proceed to step 260, otherwise control may return to step 230A. The regeneration module 90 may determine that regeneration is complete.

Step 230 may be performed for a predetermined period to provide a rapid warm up of exhaust system components including the PF. This disables or prevents use of the PI fuel limits of the first ramp rate table for the predetermined period. After the predetermined period control may return to using the first ramp rate table with PI fuel limits or may proceed with a yet another ramp rate table with PI fuel limits that are different than that of the first ramp rate table. The predetermined period may be calibrated, varied, adjusted during regeneration, and/or preset.

In step 250, the ECM may prevent regeneration. In step 252, the ECM may receive a service request signal, such as the service regeneration signal SERV. The ECM may override the regeneration disable flag to permit regeneration based on the service request signal.

In step 254, the PF is regenerated. Post-injection is enabled and initiated. A regeneration timer may be started. The regeneration time may be stored in the memory. In step 254A, the soot loading module determines the current soot loading of the PF. The soot loading may be determined as described above and based on information from the sensor signals of step 202, which may be updated.

In step 254B, before and/or during regeneration a PF temperature signal, such as the inlet temperature signal and/or the outlet temperature signal, may be generated. The PF temperature signal may be generated in step 202 and may be iteratively updated in step 254.

In step 254C, before and/or during regeneration a service PI fuel signal may be generated by a service module, such as the service module 142. The service PI fuel signal may be provided as the PI fuel update signal $PI_{UPD}$ to a fuel injection system. The service PI fuel signal may be generated based on a service ramp rate table, such as one or more of the ramp rate tables of FIG. 2, and based on the determined soot loading of step 254A and the PF temperature signal of step 254B. The service PI fuel signal may also be generated based on one or more PI fuel limits, such as a maximum PI fuel limit. The service PI fuel signal may be iteratively updated during regeneration in step 254.

In step 254D, when regeneration is completed, control may proceed to step 260, otherwise control may return to step 254A. The regeneration module 90 may determine that regeneration is complete. Control may not proceed to step 260 until reception of a permission signal. The permission signal may be generated by a service technician station.

In step 260, the regeneration module resets a PF status indicator, which may be stored in the memory. The PF status indicator indicates when the PF has been regenerated. The regeneration module may reset, for example, time since last regeneration, vehicle mileage since last regeneration, inlet and outlet pressures of the PF after last regeneration, etc. Upon completion of step 260, control may return to step 202, as shown.

The above-described steps are meant to be illustrative examples; the steps may be performed sequentially, synchronously, simultaneously, continuously, during overlapping time periods or in a different order depending upon the application.

The above-described embodiments allow for ramp rate quantity limitations of post-injection during cold weather calibration to not impact hot weather performance. Low ramp rates may not be used during hot weather conditions due to low risk of white smoke generation. The embodiments reduce white smoke generation in cold weather and increase PF warm weather performance. The embodiments also minimize PF part failures during service regeneration.

Those skilled in the art may now appreciate from the foregoing description that the broad teachings of the present disclosure may be implemented in a variety of forms. Therefore, while this disclosure includes particular examples, the true scope of the disclosure should not be so limited, since other modifications will become apparent to the skilled practitioner upon a study of the drawings, the specification and the following claims.

What is claimed is:

1. A control system for a vehicle comprising:
a first electronic circuit configured to select one of a first post-injection mode and a second post-injection mode based on a regeneration enable signal and a particulate filter (PF) temperature signal, wherein post-injected fuel is supplied to a fuel injection system during both of the first post-injection mode and the second post-injection mode; and
a second electronic circuit configured to select one of N ramp rate tables based on the selected one of the first post-injection mode and the second post-injection mode and generate a post-injected fuel signal based on the selected one of the N ramp rate tables, an ambient temperature signal and the PF temperature signal, wherein the post-injected fuel signal is generated to control a ramp-up rate of an amount of post-injection fuel to be supplied via the fuel injection system, and where N is an integer greater than 1,
wherein the second electronic circuit is configured to output the post-injected fuel signal to the fuel injection system, wherein the post-injected fuel signal indicates the amount of post-injection fuel to be supplied via the fuel injection system,
wherein the second electronic circuit does not limit an amount of post-injection fuel supplied via the fuel injection system while operating in the first post-injection mode and based on a first one of the N ramp rate tables, and is configured to limit an amount of post-injection fuel supplied via the fuel injection system while operating in the second post-injection mode based on a second one of the N ramp rate tables.

2. The control system of claim 1 wherein the first post-injection mode has a post-injected fuel ramp rate that is greater than the post-injected fuel ramp rate of the second post-injection mode.

3. The control system of claim 1 wherein the first post-injection mode has a maximum post-injected fuel value that is greater than a maximum post-injected fuel value of the second post-injection mode.

4. The control system of claim 1 wherein the second-post injection mode includes a maximum post-injected fuel limit and the first-post injection mode is independent of the maximum post-injected fuel limit.

5. The control system of claim 1 wherein the first electronic circuit is configured to select one of the first post-injection mode and the second post-injection mode based on at least one of a PF inlet temperature signal and a PF outlet temperature signal.

6. The control system of claim 1 wherein:
the first electronic circuit is configured to select one of the first post-injection mode, the second post-injection mode and a service mode based on a service signal;
the second electronic circuit is configured to use the first one of the N ramp rate tables, the second one of the N ramp rate tables and a third one of the N ramp rate tables during respectively the first post-injection mode, the second post-injection mode and the service mode;
the first one of the N ramp rate tables and the third one of the N ramp rate tables do not include a post-fuel injection limit;
the second one of the N ramp rate tables includes a post-fuel injection limit; and
the second electronic circuit is configured to generate the post-injected fuel signal based on the selection of the one of the first post-injection mode, the second post-injection mode and the service mode.

7. The control system of claim 6 wherein the second electronic circuit comprises:
a third electronic circuit that has a first output; and
a fourth electronic circuit that has a second output,
wherein the second electronic circuit is configured to selectively output one of the first output and the second output as the post-injected fuel signal based on the selected one of the first post-injection mode, the second post-injection mode and the service mode.

8. The control system of claim 7 wherein the third electronic circuit is configured to generate the first output based on the ambient temperature signal and the PF temperature signal when soot loading of a PF is less than a predetermined level, and
wherein the fourth electronic circuit is configured to generate the second output based on soot loading of the particulate filter and the PF temperature signal when soot loading of the PF is greater than a predetermined level.

9. The control system of claim 7, wherein each of the first electronic circuit, the second electronic circuit, the third electronic circuit, the fourth electronic circuit includes at least one of an electronic circuit, an application specific integrated circuit, a processor, memory, and a combinational logic circuit.

10. The control system of claim 1 wherein:
the second electronic circuit is configured to generate the post-injected fuel signal based on a first one of the N ramp rate tables when the PF temperature signal is less than or equal to a predetermined temperature and generates the post-injected fuel signal based on a second one of the N ramp rate tables when the PF temperature signal is greater than the predetermined temperature;
the second one of the N ramp rate tables includes a post-injection fuel limit; and
the first one of the N ramp rate tables does not include a post-injection fuel limit.

11. The control system of claim 10 wherein the second electronic circuit is configured to generate the post-injected fuel signal based on the second one of the N ramp rate tables for a predetermined period and when the ambient temperature signal is less than or equal to a second predetermined temperature, and wherein after the predetermined period the second electronic circuit is configured to generate the post-injected fuel signal based on at least one of the first one of the N ramp rate tables and a third one of the N ramp rate tables, independent of the second one of the ramp rate tables, and when the ambient temperature signal is greater than the second predetermined temperature.

12. A post-fuel injection system comprising the control system of claim 10 and further comprising:
an ambient temperature sensor that generates the ambient temperature signal; and
at least one of an inlet temperature sensor and an outlet temperature sensor that generates the temperature signal.

13. The control system of claim 1 wherein the second electronic circuit is configured to generate the post-injected fuel signal based on soot loading of the particulate filter and the temperature signal.

14. A post-fuel injection system comprising the control system of claim 13 and further comprising:
an inlet pressure sensor that detects inlet pressure of the particulate filter and that generates an inlet pressure signal; and
an outlet pressure sensor that detects outlet pressure of the particulate filter and that generates an outlet pressure signal,
wherein the second electronic circuit is configured to determine the soot loading based on the inlet pressure signal and the outlet pressure signal.

15. A post-fuel injection system comprising the control system of claim 13 and further comprising:
an inlet temperature sensor that detects inlet temperature of the particulate filter and that generates an inlet temperature signal; and
an outlet temperature sensor that detects outlet temperature of the particulate filter and that generates an outlet temperature signal,
wherein the second electronic circuit is configured to determine the soot loading based on the inlet temperature signal and the outlet temperature signal.

16. The control system of claim 1 wherein the second electronic circuit is configured to generate the post-injected fuel signal based on the first one of the N ramp rate tables when the ambient temperature signal is less than or equal to a second predetermined temperature and generate the post-injected fuel signal based on the second one of the N ramp rate tables when the ambient temperature signal is greater than the second predetermined temperature.

17. The control system of claim 1 wherein the second electronic circuit is configured to, while limiting the post-injection fuel supplied via the fuel injection system, generate the post-injected fuel signal based on a post-fuel injection limit when the ambient temperature signal is greater than or equal to a predetermined ambient temperature.

18. The control system of claim 1 wherein the second electronic circuit is configured to, while limiting the post-injection fuel supplied via the fuel injection system, generate the post-injected fuel signal based on a post-fuel injection limit when the PF temperature signal is greater than or equal to a predetermined PF temperature.

19. The control system of claim 1, wherein the first electronic circuit is a same electronic circuit as the second electronic circuit.

20. A post-injection method for an exhaust system of a vehicle comprising:
selecting one of a first post-injection mode and a second post-injection mode based on a regeneration enable signal and a particulate filter (PF) temperature signal, wherein post-injected fuel is supplied to a fuel injection system during both of the first post-injection mode and the second post-injection mode;
selecting one of N ramp rate tables based on the selected one of the first post-injection mode and the second post-injection mode, where N is an integer greater than 1;
based on the selected one of the N ramp rate tables, an ambient temperature signal and the PF temperature signal, generating a post-injected fuel signal to control a ramp-up rate of an amount of post-injection fuel to be supplied via the fuel injection system;
outputting the post-injected fuel signal to the fuel injection system, wherein the post-injected fuel signal indicates the amount of post-injection fuel to be supplied via the fuel injection system;
not limiting the amount of post-injection fuel supplied via the fuel injection system while operating in the first post-injection mode based on a first one of the N ramp rate tables; and
limiting the amount of post-injection fuel supplied via the fuel injection system while operating in the second post-injection mode based on a second one of the N ramp rate tables.

21. The method of claim 20 wherein the first post-injection mode has a post-injected fuel ramp rate that is greater than the post-injected fuel ramp rate of the second post-injection mode,
wherein the first post-injection mode has a maximum post-injected fuel value that is greater than a maximum post-injected fuel value of the second post-injection mode, and
wherein the second-post injection mode includes a maximum post-injected fuel limit and the first-post injection mode is independent of the maximum post-injected fuel limit.

22. The method of claim 20 further comprising selecting one of the first post-injection mode, the second post-injection mode and a service mode based on a service signal, and
generating the post-injected fuel signal based on the selection of the one of the first post-injection mode, the second post-injection mode and the service mode,
generating a first output based on the ambient temperature signal and the PF temperature signal;
generating a second output based on soot loading of the particulate filter and the PF temperature signal; and
outputting one of the first output and the second output as the post-injected fuel signal based on the selected one of the first post-injection mode, the second post-injection mode and the service mode.

23. The method of claim 20 wherein the post-injected fuel signal is generated based on the first one of the N ramp rate tables when the PF temperature signal is less than or equal to a predetermined temperature, and
wherein the post-injected fuel signal is generated based on the second one of the N ramp rate tables when the PF temperature signal is greater than the predetermined temperature.

24. The method of claim 20 wherein the post-injected fuel signal is generated based on the second one of the N ramp rate tables for a predetermined period, and
wherein after the predetermined period the post-injected fuel signal is generated based on at least one of the first one of the N ramp rate tables and a third one of the N ramp rate tables and independent of the second one of the ramp rate tables.

* * * * *